US008037681B2

(12) United States Patent
Kraft

(10) Patent No.: US 8,037,681 B2
(45) Date of Patent: Oct. 18, 2011

(54) HYDROSTATIC DRIVE SYSTEM

(75) Inventor: Wolfgang Kraft, Ringheim (DE)

(73) Assignee: Linde Material Handling GmbH (DE)

( * ) Notice: Subject to any disclaimer, the term of this patent is extended or adjusted under 35 U.S.C. 154(b) by 361 days.

(21) Appl. No.: 11/637,211

(22) Filed: Dec. 11, 2006

(65) Prior Publication Data

US 2007/0151238 A1 Jul. 5, 2007

(30) Foreign Application Priority Data

Dec. 12, 2005 (DE) ........................ 10 2005 059 240

(51) Int. Cl.
*F16D 31/02* (2006.01)

(52) U.S. Cl. ........................................... 60/452; 60/468

(58) Field of Classification Search .................... 60/452, 60/468

See application file for complete search history.

(56) References Cited

U.S. PATENT DOCUMENTS 5,129,230 A * 7/1992 Izumi et al. ..................... 60/452
5,638,677 A * 6/1997 Hosono et al. .................. 60/452
5,931,078 A 8/1999 Kropp
2005/0011190 A1* 1/2005 Bitter ............................. 60/468

FOREIGN PATENT DOCUMENTS

DE 196 15 593 A1 10/1997

* cited by examiner

*Primary Examiner* — Daniel Lopez
(74) *Attorney, Agent, or Firm* — The Webb Law Firm

(57) ABSTRACT

A hydrostatic drive system (1) has a load-sensing pump (2) with an adjustable discharge volume and at least one consumer connected to the pump (2). The discharge volume of the pump (2) can be set by a discharge volume control device (6) that sets the delivery pressure of the pump available in a delivery line (4) of the pump (2) so that it is higher by a pilot control pressure difference than the load pressure of the consumer. The discharge volume control device (6) can be actuated by an electronic control device (7) functionally connected with a sensor device (9) for measuring the load pressure of the consumer and with a sensor device (8) for measuring the delivery pressure available in the delivery line (4). A circulation device (15) is associated with the delivery line (4) to control the connection of the delivery line (4) with a reservoir (3).

17 Claims, 1 Drawing Sheet

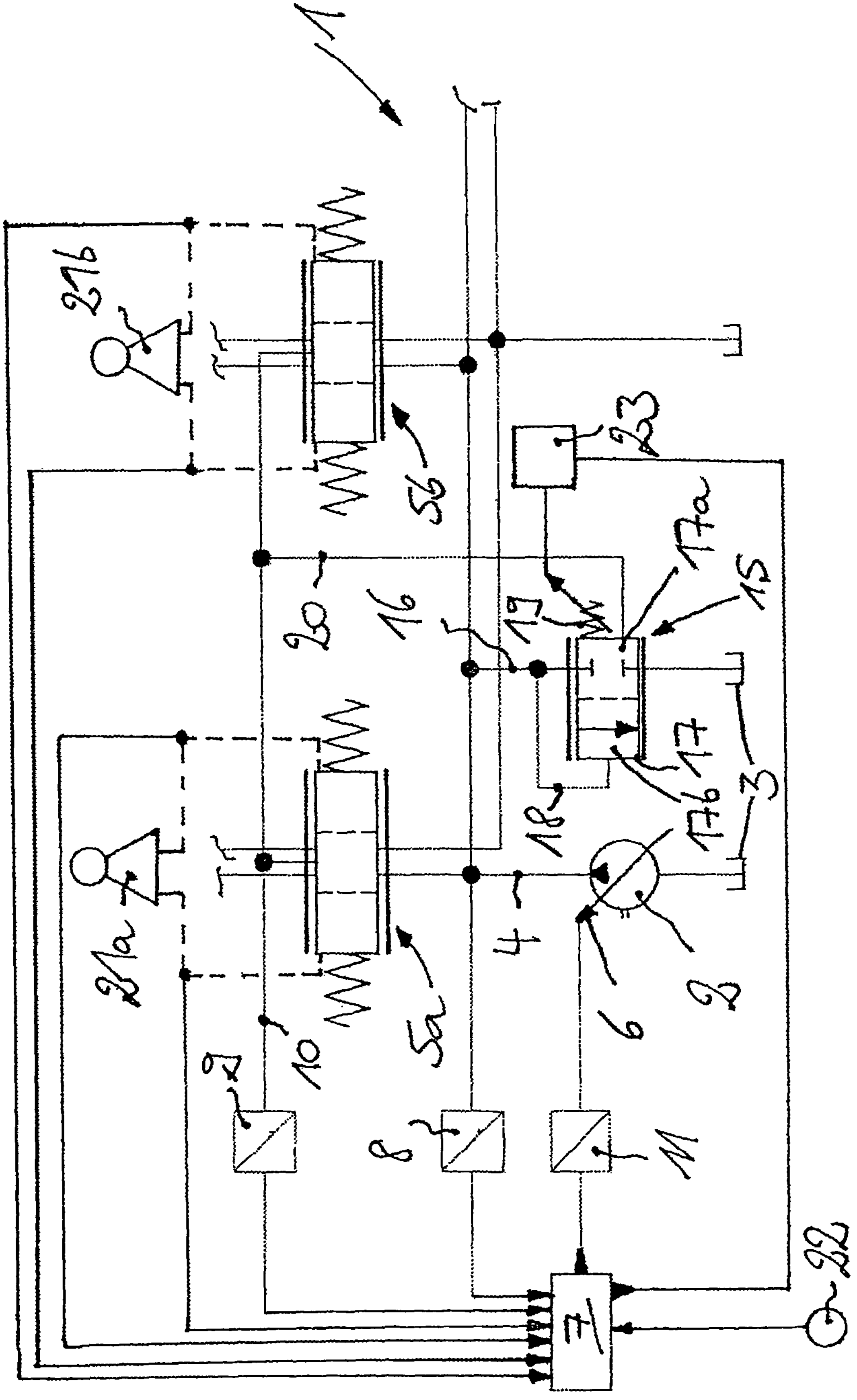
1
21b
5b
23
20
16
19
17a
15
17
17b
18
3
21a
4
6
2
5a
10
9
8
11
22

HYDROSTATIC DRIVE SYSTEM

CROSS REFERENCE TO RELATED APPLICATION

This application claims priority to German Application No. 10 2005 059 240.6, filed Dec. 12, 2005, which application is herein incorporated by reference in its entirety.

BACKGROUND OF THE INVENTION

1. Field of the Invention

This invention relates to a hydrostatic drive system having a load-sensing pump with an adjustable discharge volume and at least one consumer connected to the pump. The discharge volume of the pump can be set by means of a discharge volume control device that sets the delivery pressure available in a delivery line of the pump so that it is higher by a pilot control pressure difference than the load pressure of the consumer.

2. Technical Considerations

Load-sensing drive systems are used in mobile work machines, for example in construction equipment in the form of excavators, as well as in industrial trucks. A drive system is described in DE 196 15 593 A1. In that case, the discharge volume control device of the pump has a load-sensing control valve. The load-sensing control valve is actuated by the highest load pressure of the consumers being actuated and by a spring (the bias of which is equal to a pilot control pressure difference) toward an increase of the delivery flow of the pump, and by the delivery pressure delivered by the pump toward a reduction of the delivery output. The pump thereby delivers an output having a delivery pressure that is higher by the pilot control pressure difference exerted by the spring than the highest load pressure of the actuated consumers. With a drive system of this type, the consumers can be operated independently of the load at a speed of movement that is specified by the opening width of a control valve.

In the drive system described in DE 196 15 593 A1, the discharge volume control device of the pump is hydraulically controlled by the load-sensing control valve. For the measurement and transmission of the highest load pressure of the consumers to the load-sensing flow control valve, load pressure signal lines are necessary. This entails a great deal of construction effort and the signal lines are prone to leaks, which result in inaccuracies of the output flow control of the pump. The load pressure signal lines are also subject to the effects of temperature, which lead to variations of the load pressure and, thus, to inaccuracies in the control of the output flow of the pump. On mobile work machines, in particular on excavators, the load pressure signal lines can be of a significant length. As a result of which, the transmission of the load pressure of the consumer to the load-sensing flow control valve takes a long time and, thus, the movement of the consumer has a long reaction time as a result of the delayed regulation of the output flow of the pump.

Therefore, it is an object of this invention to provide a hydrostatic drive system of the general type described above but that makes possible an improved reaction of the consumers with little construction effort.

SUMMARY OF THE INVENTION

The invention teaches that the discharge volume control device of the pump can be actuated by means of an electronic control device that is functionally connected with a sensor device for the measurement of the load pressure of the consumer and a sensor device for the measurement of the delivery pressure that is present in the delivery line of the pump. A circulation device is associated with the delivery line of the pump. The circulation device controls the connection of the delivery line of the pump with a reservoir. The invention thus teaches that the discharge volume control device of the pump can be actuated electrically, and can have respective sensor devices for the measurement of the highest load pressure of the actuated consumers and for the measurement of the pressure delivered by the pump. The circulation device is provided to compensate for inaccuracies in this electrical actuation of the discharge volume control device and to ensure that the consumer is provided with a delivery pressure that is equal to or less than the sum of a target pilot control pressure difference plus the load pressure of the consumer, for the operation of the consumer independently of the load.

Therefore, in the drive system of the invention, no load pressure signal lines leading to the discharge volume control device of the pump are necessary for the actuation of the discharge volume control device. As a result of which, the drive system requires little construction effort. The drive system of the invention is also insensitive to the effects of temperature on account of the electrical actuation of the discharge volume control device. The electrical actuation of the discharge volume control device can also have a simple construction with a low control accuracy of the pilot control pressure difference for all load pressures on account of the presence of the circulation device. As a result of which, the electrical actuation also requires little construction effort. The circulation device can be located separately from the pump and in the vicinity of the control valves that control the consumers. As a result of which, a high reaction speed of the consumers and, thus, a fast reaction time of the movement of the consumer can be achieved. As a result of the elimination of the load pressure signal lines leading to the discharge volume control device of the pump and the simple construction of the electrical actuation of the discharge volume control device in connection with the circulation device, it thereby becomes possible, with little construction effort, to achieve a drive system that has an improved reaction response on the part of the consumers.

In one exemplary embodiment of the invention, the circulation device is a relief valve that can be moved by a spring toward a closed position and by the load pressure of the consumer toward a closed position. The bias of the spring preferably equals the target pilot control pressure difference. With a relief valve of this type, it becomes possible in a simple manner for the output flow of the pump that is set to minimum flow when consumers are not actuated to flow to the reservoir with little loss of power. When the consumer is actuated, the relief valve is moved into the closed position by the load pressure of the consumer, as a result of which the consumer can be activated.

It is particularly advantageous if, as in one preferred embodiment of the invention, the circulation device is in the form of a pressure balance that can be moved by a spring and by the load pressure of the consumer toward a closed position and by the delivery pressure of the pump toward an open position, wherein the bias of the spring is equal to the target pilot control pressure difference. With a pressure balance of this type, it is easily possible to accurately set the target pilot control pressure difference for the activation of the consumer independently of the load. As a result of which, inaccuracies in the electrical actuation of the discharge volume control device of the pump, e.g., pressure fluctuations of the delivery pressure of the pump, can be equalized and, thus, the electrical actuation of the discharge volume control device of the pump can have a simple and economical construction with a low control accuracy for all load pressures. If, when the consumers are not actuated, the pump is set to a minimum discharge volume and a minimum delivery flow is supplied, with a pressure balance of this type, when a consumer is actuated, the movement of the consumer can be started by an actuation of the pressure balance by the load pressure of the consumer toward the closed position, to start the movement of the consumer before the pump reacts to a demand for delivery flow, as a result of which fast reaction times can be achieved at the start of the movement of the consumer.

In one development of the invention, the bias of the spring of the pressure balance can be adjusted electrically. Consequently, it is possible in a simple manner to influence the target pilot control pressure difference specified to the pressure balance by varying the spring bias.

The electronic control device is thereby advantageously functionally connected with a control device that varies the bias of the spring of the pressure balance. As a result of which, the target pilot control pressure difference of the pressure balance can be varied in a simple manner.

It is particularly advantageous if, as in one development of the invention, the bias of the spring of the pressure balance can be reduced to a minimum target pilot control pressure difference during idle operation of the drive system. As a result, the circulation losses can be reduced during idle operation of the drive system when the consumers are not actuated. As a result of which, the drive system of the invention has low power losses.

If the electronic control device is functionally connected with a sensor device that detects the idle operation of the drive system, the bias of the spring of the pressure balance can be reduced in a simple manner to a minimum target pilot control pressure difference during the idle operation of the drive system.

In one preferred configuration of the invention, the sensor device that detects the idle operation can be in the form of a sensor device that detects the presence of an operator. On drive systems of the invention that can be used in mobile work machines (such as construction equipment or industrial trucks, for example), the idle operation of the drive system can be easily detected with a sensor device, such as a seat switch, for example, that detects the presence of an operator.

The idle operation of the drive system can also be detected in a simple manner if, as in one advantageous embodiment of the invention, a control valve to control the consumer is provided that can be actuated by means of control signals, with the electronic control device functionally connected with the control signals to detect the idle operation.

Particular advantages can be achieved if, as in one development of the invention, by means of the electronic control device that receives the control signal, the discharge volume control device of the pump can be actuated chronologically before an activation of the control valve. As a result, the discharge volume control device of the pump is moved toward an increase of the delivery flow before the control valve is actuated. As a result of which, the response of the consumer movement can be further improved.

BRIEF DESCRIPTION OF THE DRAWING

Additional advantages and features of the invention are explained in greater detail below with reference to the exemplary embodiment illustrated in the accompanying schematic FIGURE that shows a schematic diagram of a drive system incorporating features of the invention.

DESCRIPTION OF THE PREFERRED EMBODIMENT

The FIGURE presents a schematic diagram of a drive system 1 of the invention, which is provided by way of example for the control of the consumers of a mobile work machine, in particular of a unit of construction equipment in the form of an excavator or for the hydraulic work system of an industrial truck.

The drive system 1 has a pump 2. The discharge volume of the pump 2 is adjustable and sucks pressure fluid out of a reservoir 3 and transports it in a delivery line 4. Connected to the delivery line 4 are control valves 5*a*, 5*b* for the actuation of conventional consumers that are not illustrated in any further detail. Associated with the consumers and/or the control valves 5*a*, 5*b* are conventional pressure balances (that are not illustrated in any further detail) for the actuation of the consumers independently of the load.

The invention teaches that a discharge volume device 6, for example a swashplate, of the pump 2 can be actuated electrically. For this purpose, an electronic control device 7 is provided, which is functionally connected on the output side with an activation device 11, such as an electrically actuatable load-sensing control valve, for example, of the discharge volume control device 6. On the input side, the electronic control device 7 is connected with a sensor device 8, which is functionally connected with the delivery line 4 of the pump 2 for the detection of the delivery pressure of the pump 2. The control device 7 can be connected on the input side with a sensor device 9 for the measurement of the highest load pressure of the consumers. In this case, the sensor device 9 measures the highest load pressure of the actuated consumers in a load pressure signal line 10. By means of the electronic control device 7, the discharge volume control device 6 of the pump 2 is thereby actuated so that a delivery pressure is generated in the delivery line 4. The delivery pressure is higher by the pilot control pressure difference than the highest load pressure in the load pressure signal line 10 of the actuated consumers.

The invention further provides a circulation device 15 located in a connecting line 16 that connects the delivery line 4 with the reservoir 3. The circulation device 15 is realized in the form of a pressure balance 17 that has a closed position 17*a* and an open position 17*b*. The pressure balance 17 is moved toward the open position 17*b* by the delivery pressure available in the delivery line 4. For this purpose, a control line 18 that is in communication with the connecting line 16 upstream of the pressure balance 17 is connected to a control surface of the pressure balance 17 that acts toward the open position 17*b*. The pressure balance 17 is actuated toward the closed position 17*a* by a spring 19 and by the highest load pressure of the consumers. For this purpose, a control surface of the pressure balance 17 that acts toward the closed position 17*a* is connected with a control line 20 that is in communication with the load pressure signal line 10. The bias of the spring 19 equals a target pilot control pressure difference.

The circulation device 15 that is realized in the form of a pressure balance 17 can be located separately from the pump 2 in the vicinity of the control valves 5*a*, 5*b*. As a result of which, the control line 18 and, in particular, the control line 20 can be short.

The control valves 5*a*, 5*b* can be activated electrically and/or electro-hydraulically. For this purpose, control devices 21*a*, 21*b*, such as joysticks, are provided. The control signals from the control devices 21*a*, 21*b* that actuate the control valves 5*a*, 5*b* are also in communication on the input side with the electronic control device 7.

The electronic control device 7 is also in communication on the input side with a sensor device 22 that detects the idle operation of the drive system 1, for example a seat switch that detects the presence of an operator. The electronic control device 7 can also be in functional communication with a control device 23, by means of which the bias of the spring 19 of the pressure balance 17 can be varied.

When the drive system is at idle operation and the control valves 5*a*, 5*b* are not actuated (this operating condition can be detected on the basis of the control signals from the control devices 21*a*, 21*b* or on the basis of the signal from the sensor device 22), the spring 19 of the pressure balance 17 is set to a minimum target pilot control pressure difference. The pump 2 is set to a minimum discharge volume, whereby the minimum delivery flow supplied by the pump 2 can be discharged to the reservoir 3 via the pressure balance 17, which has been placed in the open position 17*b*, with low power losses.

When the control device 21*a*, 21*b* is operated to actuate the control valves 5*a*, 5*b*, the bias of the spring 19 of the pressure balance 17 is increased to the target pilot control pressure difference. The electronic control device 7 detects the highest load pressure of the actuated consumers by means of the sensor device 9 and the delivery pressure of the pump 2 by means of the sensor device 8. The electronic control device 7 actuates the discharge volume control device 6 to increase the delivery flow, such that the delivery pressure of the pump 2 is higher by the pilot control pressure difference than the maximum load pressure of the actuated consumers.

The electronic control device 7 thereby has a simple construction with a low control accuracy. By means of the pressure balance 17, whereby the bias of the spring 19 is exactly equal to the target pilot control pressure difference, the invention ensures that a delivery pressure is available at the control valves 5*a*, 5*b* for the operation of the consumers independently of the load and is higher by the target pilot control pressure difference than the highest load pressure of the actuated consumers. Pressure fluctuations of the pump 2 on account of the electrical actuation of the discharge volume control device 6 and the low control accuracy of the electronic control device 7 can therefore be compensated for in a simple manner.

As a result of the actuation of the pressure balance 17 toward the closed position 17*a* by the highest load pressure of the actuated consumers, when the consumers are actuated, the minimum delivery flow supplied by the pump 2 can be used for the start of the consumer movement before the pump 2 is actuated by means of the electronic control device 7 by an actuation of the discharge volume control device 6 toward an increase of the discharge volume.

By means of the electronic control device 7, when the consumers are actuated on the basis of the control signals from the control devices 21*a*, 21*b*, the discharge volume control device 6 of the pump 2 can be actuated toward an increase in the discharge volume before the control valves 5*a*, 5*b* are actuated.

In the drive system of the invention, no load pressure signal line that leads to the discharge volume control device 6 of the pump 2 is necessary on account of the electrical actuation of the discharge volume control device 6. The pressure balance 17 can be located in the vicinity of the control valves 5*a*, 5*b*. As a result of which, the control line 20 is shorter than in conventional devices. As a result of the circulation device 15 (which is realized in the form of a pressure balance 17 and makes possible an accurate regulation and maintenance of the target pilot control pressure difference for the operation of the consumers independently of the load), the electronic control device 7 can have a low control accuracy for all load pressures and, thus, a simple construction. Consequently, a drive system is made available that requires little construction effort and makes possible movement of the consumers with a high speed of reaction.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A hydrostatic drive system, comprising:

a load-sensing pump having an adjustable discharge volume;

at least one consumer connected to the pump;

a discharge volume control device, wherein a discharge volume of the pump is set by the discharge volume control device which sets a delivery pressure of the pump available in a delivery line of the pump so that the delivery pressure of the pump is higher by a pilot control pressure difference than a load pressure of the consumer;

an electronic control device that actuates the discharge volume control device of the pump, the electronic control device being functionally connected with a sensor device for measuring the load pressure of the consumer and with a sensor device for measuring the delivery pressure available in the delivery line of the pump; and a circulation device associated with the delivery line of the pump to control a connection of the delivery line of the pump with a reservoir, the circulation device including a spring, wherein a pressure in the delivery line is equal to or less than a sum of the load pressure of the consumer plus a target pilot control pressure difference of the hydrostatic drive system to achieve a load-independent operation of the consumer in the hydrostatic drive system, wherein the circulation device performs a load-sensing control and accurately controls the pressure in the delivery line so that the pressure in the delivery line is equal to or less than the sum of the load pressure of the consumer plus the target pilot control pressure difference of the hydrostatic drive system and wherein the circulation device is actuated by the spring toward a closed position, a bias of the spring being equal to the target pilot control pressure difference of the hydrostatic drive system, and wherein the electronic control device actuates the discharge volume control device with a low degree of control accuracy for all load pressures.

2. The hydrostatic drive system of claim 1, wherein the circulation device comprises a relief valve that is actuated by the spring toward a closed position and by the load pressure of the consumer toward a closed position.

3. The hydrostatic drive system of claim 1, wherein the circulation device comprises a pressure balance that is actuated by the spring and by the load pressure of the consumer toward a closed position and by the delivery pressure of the pump toward an open position.

4. The hydrostatic drive system of claim 3, wherein the bias of the spring of the pressure balance is adjusted electrically.

5. The hydrostatic drive system of claim 4, wherein the electronic control device is functionally connected with a control device that varies the bias of the spring of the pressure balance.

6. The hydrostatic drive system of claim 5, wherein the bias of the spring of the pressure balance is reduced to a minimum pilot control pressure difference during idle operation of the drive system.

7. The hydrostatic drive system of claim 6, wherein the electronic control device is functionally connected with a sensor device that detects the idle operation of the drive system.

8. The hydrostatic drive system of claim 7, wherein the sensor device that detects the idle operation comprises a sensor device that detects the presence of an operator.

9. The hydrostatic drive system of claim 7, further including a control valve for control of the consumer, wherein the control valve is actuated by control signals, and wherein the electronic control device is functionally connected with the control signals for detection of idle operation.

10. The hydrostatic drive system of claim 9, wherein the discharge volume control device of the pump is actuated chronologically prior to an actuation of the control valve by the electronic control device when the control signal is present.

11. The hydrostatic drive system of claim 4, wherein the bias of the spring of the pressure balance is reduced to a minimum target pilot control pressure difference during idle operation of the drive system.

12. The hydrostatic drive system of claim 11, wherein the electronic control device is functionally connected with a sensor device that detects the idle operation of the drive system.

13. The hydrostatic drive system of claim 12, wherein the sensor device that detects the idle operation comprises a sensor device that detects the presence of an operator.

14. The hydrostatic drive system of claim 12, further including a control valve for control of the consumer, wherein the control valve is actuated by control signals, and wherein the electronic control device is functionally connected with the control signals for detection of idle operation.

15. The hydrostatic drive system of claim 14, wherein the discharge volume control device of the pump is actuated chronologically prior to an actuation of the control valve by the electronic control device when the control signal is present.

16. The hydrostatic drive system of claim 1, wherein the electronic control device sets the delivery pressure of the pump so that the pilot control pressure difference of the pump is approximately equal to the target pilot control pressure difference of the circulation device.

17. A hydrostatic drive system, comprising:

a load-sensing pump having an adjustable discharge volume;

at least one consumer connected to the pump;

a discharge volume control device, wherein a discharge volume of the pump is set by the discharge volume control device which sets a delivery pressure of the pump available in a delivery line of the pump so that the delivery pressure of the pump is higher by a pilot control pressure difference than a load pressure of the consumer;

an electronic control device that actuates the discharge volume control device of the pump, the electronic control device being functionally connected with a sensor device for measuring the load pressure of the consumer and with a sensor device for measuring the delivery pressure available in the delivery line of the pump; and a circulation device associated with the delivery line of the pump to control a connection of the delivery line of the pump with a reservoir, the circulation device including a spring, wherein the circulation device accurately controls a pressure in the delivery line so that the pressure in the delivery line is equal to or less than a sum of the load pressure of the consumer plus a target pilot control pressure difference of the hydrostatic drive system and wherein the circulation device is actuated by the spring toward a closed position, a bias of the spring being equal to the target pilot control pressure difference, wherein the electronic control device actuates the discharge volume control device with a low degree of control accuracy, and wherein the electronic control device sets the target pilot control pressure difference independent of a measured load pressure of the consumer.

* * * * *